US009342558B2

(12) United States Patent
Elias et al.

(10) Patent No.: US 9,342,558 B2
(45) Date of Patent: May 17, 2016

(54) SYSTEMS, METHODS, AND COMPUTER PROGRAM PRODUCTS FOR SELECTING A MACHINE TO PROCESS A CLIENT REQUEST

(71) Applicant: Red Hat, Inc., Raleigh, NC (US)

(72) Inventors: Filip Elias, Vysni Lhoty (CZ); Filip Nguyen, Brno (CZ)

(73) Assignee: RED HAT, INC., Raleigh, NC (US)

( * ) Notice: Subject to any disclaimer, the term of this patent is extended or adjusted under 35 U.S.C. 154(b) by 612 days.

(21) Appl. No.: 13/756,267

(22) Filed: Jan. 31, 2013

(65) Prior Publication Data

US 2014/0214805 A1 Jul. 31, 2014

(51) Int. Cl.
G06F 17/30 (2006.01)
(52) U.S. Cl.
CPC .............................. G06F 17/30522 (2013.01)
(58) Field of Classification Search
CPC ................................................ G06F 17/30522
USPC ........................................................ 707/722
See application file for complete search history.

(56) References Cited

U.S. PATENT DOCUMENTS

| 2008/0069124 | A1* | 3/2008 | Patrick | 370/401 |
| 2008/0137546 | A1* | 6/2008 | Boyd et al. | 370/252 |
| 2010/0293268 | A1* | 11/2010 | Jones et al. | 709/224 |
| 2011/0004446 | A1* | 1/2011 | Dorn et al. | 702/188 |
| 2011/0040892 | A1 | 2/2011 | Amemiya et al. | |
| 2011/0289206 | A1 | 11/2011 | Vecera et al. | |
| 2011/0289512 | A1 | 11/2011 | Vecera et al. | |
| 2012/0272245 | A1 | 10/2012 | Ryman | |

* cited by examiner

Primary Examiner — Joshua Bullock
(74) Attorney, Agent, or Firm — Haynes and Boone, LLP

(57) ABSTRACT

A method includes consulting a database that includes a first entry indicating amounts of time that a first service provider machine takes to perform individual actions of the plurality of actions and a second entry indicating amounts of time that a second service provider machine takes to perform individual actions of the plurality of actions; generating a first estimate for the amount of time the first service provider machine is expected to take in processing the requested service, wherein generating the first estimate includes summing times associated with the plurality of actions from the first entry; and generating a second estimate for the amount of time the second service provider machine is expected to take in processing the requested service, wherein generating the second estimate includes summing times associated with the plurality of actions from the second entry.

20 Claims, 4 Drawing Sheets

SYSTEMS, METHODS, AND COMPUTER PROGRAM PRODUCTS FOR SELECTING A MACHINE TO PROCESS A CLIENT REQUEST

BACKGROUND

1. Technical Field

The present disclosure generally relates to selecting among service providing machines and, more specifically, to selecting using information regarding time that the machines use to perform individual actions of a requested service.

2. Related Art

Service Oriented Architecture (SOA) is a concept that includes developing software to be provided as one or more interoperable services. Each of the services has an interface that is defined in terms of protocols and functionality, which allows an SOA system to integrate many different services. In a typical scenario, a consumer of the services (sometimes referred to as a client) accesses the services over a network. SOA can be used, for instance, in an enterprise to provide a wide variety of business logic functions to consumers in a manner that is convenient and easy to access. An example of a form that some SOA services take is Web Services, which includes the provision of functionalities over the World Wide Web (the web), although SOA is not necessarily limited to Web Services. SOA services may be implemented in some enterprises as middleware and may be customized by the enterprise's Information Technology (IT) staff to be adapted for specific business needs of the enterprise.

Some enterprises have access to very large computer systems, where multiple machines within the computer system may provide the same or similar services. For instance, a payroll calculator service may be implemented on multiple machines in order to provide access to the service to multiple consumers at the same time while minimizing delay in access thereto.

BRIEF SUMMARY

Figure 1:
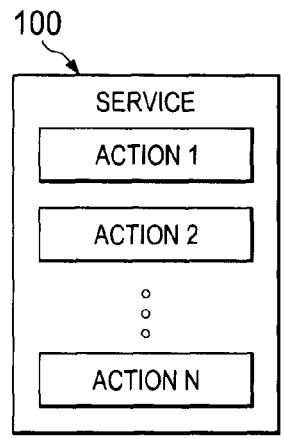
FIG. 1 is an illustration of an example service, adapted according to one embodiment.

According to one embodiment, a method includes receiving a request for a service from a client device, wherein the service is constituted by a plurality of discrete actions; consulting a database that includes a first entry indicating amounts of time that a first service provider machine takes to perform individual actions of the plurality of actions and a second entry indicating amounts of time that a second service provider machine takes to perform individual actions of the plurality of actions; generating a first estimate for the amount of time the first service provider machine is expected to take in processing the requested service, wherein generating the first estimate includes summing times associated with the plurality of actions from the first entry; generating a second estimate for the amount of time the second service provider machine is expected to take in processing the requested service, wherein generating the second estimate includes summing times associated with the plurality of actions from the second entry; and sending the request to either the first or the second service provider machine based at least in part on the first and second estimates.

According to another embodiment, a system includes one or more server computers in a Service Oriented Architecture (SOA) system, the one or more server computers providing load-balancing functionality and including: a database with a plurality of entries, a first entry being associated with a first service provider machine and including first processing times associated with each action of a plurality of actions, and a second entry being associated with a second service provider machine and including second processing times associated with each action of the plurality of actions; and load balancing logic that receives a request for a service from a client device, wherein the service comprises a first subset of the actions of the plurality of actions, the load balancing logic further estimating a time to perform the service by the first service provider machine by consulting the first entry for times corresponding to the first subset of actions and estimating a time to perform the service by the second service provider machine by consulting the second entry for times corresponding to the first subset of actions, the load balancing logic further sending the request to either the first or the second service provider machine based on estimating the times to perform the service.

According to yet another embodiment, a computer program product has a computer readable medium tangibly recording computer program logic for processing a client request for a service, the computer program product including code to receive the client request for the service, wherein the service is constituted by a set of discrete actions; code to compare running times for the service on first machine and on a second machine, wherein the code to compare includes: code to estimate a first running time for the service on the first machine by acquiring first data corresponding to each of the individual actions of the set of actions at the first machine and code to estimate a second running time for the service on the second machine by acquiring second data corresponding to each of the individual actions of the set of actions at the second machine; and code to send the client request to the first machine or the second machine based at least in part on comparing the running times for the service.

DETAILED DESCRIPTION

It is to be understood that the following disclosure provides many different embodiments, or examples, for implementing different features of the present disclosure. Specific examples of components and arrangements are described below to simplify the present disclosure. These are, of course, merely examples and are not intended to be limiting. Various features may be arbitrarily drawn in different scales for simplicity and clarity.

According to the various aspects of the present disclosure, a method, system, and computer program product are discussed below that allow for selecting among a multitude of different machines offering a same or similar service. Various embodiments described below solve the problem of selection of a machine by predicting a running time of a particular service for each of a variety of available machines and selecting a particular machine based on the predicted running time.

Various examples described below implement a technique of metadata retrieval and storage for decision making. One example augments the concept of load balancing by using a Service Time Tracking Repository (STTR) that stores information to aid in predicting latency among the different machines for a given requested service. The STTR is described in more detail below with respect to FIG. 2.

FIG. 1 is an illustration of example service 100, adapted according to one embodiment. As shown in FIG. 1, service 100 is composed of a set of discrete actions 1 . . . N. In this example, the service 100 includes a coarse-grained function that is understandable by a business. For instance, service 100 may include functionality to compute an employee's pay, and it may be implemented as a calculator interface within a larger web portal interface for a human user. Each of the actions 1 through N may include a finer-grained task within the larger job of computing pay, such as counting available vacation days, counting hours worked, accounting for automatic benefits deductions, etc. The scope of embodiments is not limited to any particular services, as the concepts in the examples below may be applied to any appropriate business service.

The STTR records the running time for each action 1 through N for each service provider machine so that each machine has an entry for each action 1 through N in the database of the STTR. In some examples, the STTR communicates with each service provider machine and collects information about running time for each discrete action as the information becomes available. When a client sends a request for a service, a load balancer communicates with a Service Time Decision Maker (STDM), which selects a particular service provider machine using the running time information in the STTR.

In one use example, an SOA system provides a variety of services to a client by employing multiple service provider machines. Over time, as the service provider machines run actions in response to client requests, the STTR monitors the service provider machines and populates a database with running times for the different actions at each machine. Thus, the STTR database may be more robust as time goes on due to continual or periodic gathering of the performance information by the STTR.

Continuing with the use example, when the server receives a request from a client for service 100 it consults the STTR to determine which actions are associated with service 100. In FIG. 1, actions 1 through N are associated with the service 100, so the server then accesses the database in the STTR to determine for each action 1 through N the approximate or estimated running time for each different machine. In an example in which there are two different machines, the server adds up the running times for actions 1 through N for the first machine and also adds up the running times for actions 1 through N for the second machine. Following the adding, the server has estimated running times for service 100 for each machine and compares those estimated running times to discern which machine is likely to perform service 100 with less latency. The server then selects one of the machines based on the comparing and sends the client's request to the selected machine.

It is expected that estimated running times for the actions for a given machine may change over time as usage of the SOA system changes. However, in an example in which the STTR monitors the running times and updates its database continually or periodically, the system adapts to those changes by selecting a machine most likely to provide the lowest latency, and it may select different machines at different times for a same given service. Other examples are described more fully below with respect to FIGS. 2-4.

Figure 2:
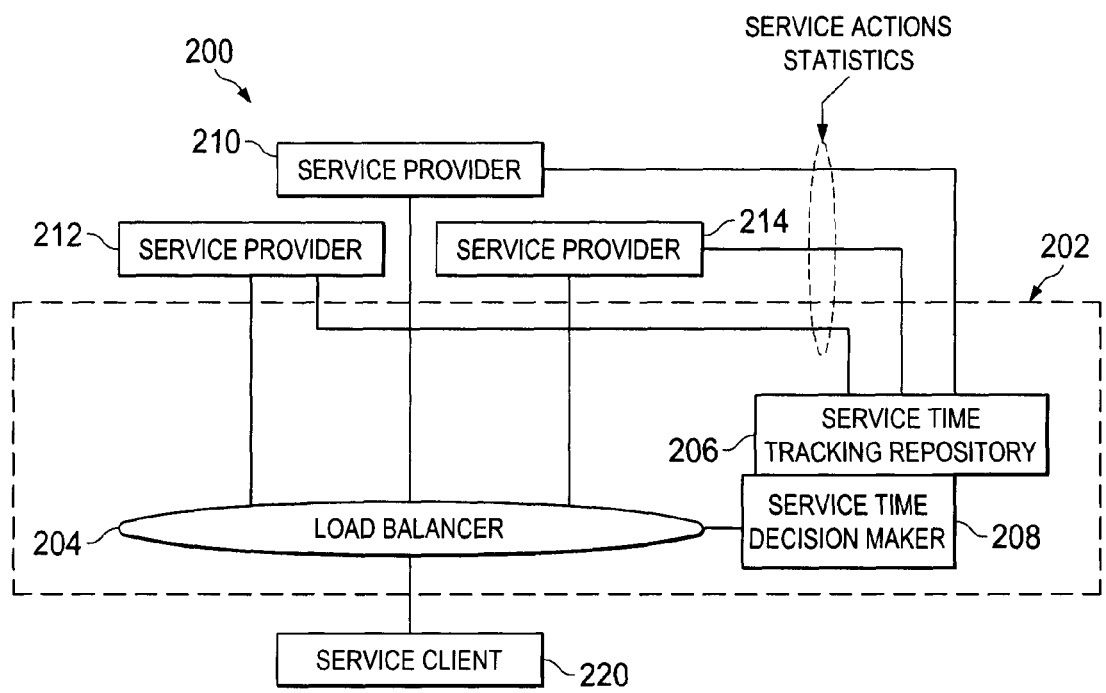
FIG. 2 illustrates an example SOA system adapted according to one embodiment.

FIG. 2 illustrates an example SOA system 200 adapted according to one embodiment. SOA system 200 includes service client 220, which may include a web browser or other application running on a computer that has a human user. For instance, service client 220 may run on a desktop or laptop computer at a human user's desk, though the scope of embodiments is not so limited. In fact, service client 220 may run on any appropriate processor-based device.

Service client 220 sends requests to, and receives information from, server 202. In this example load balancer 204, STTR 206, and STDM 208 are functionalities of server 202, where server 202 is situated between client 220 and service providers 210, 212, 214. However, the scope of embodiments includes configurations in which each of load balancer 204, STTR 206, and STDM 208 are functionalities running on separate hardware devices. In yet another example, the load balancer 204 and STDM 208 may be run on a hardware device separate from a hardware device running the STTR 206. In fact, any appropriate configuration of hardware devices may be adopted for load balancer 204, STTR 206, and STDM 208. Examples of appropriate hardware device include server computers, desktop computers, laptop computers, tablet computers, and the like.

Load balancer 204 is in communication with service providers 210, 212, 214. STDM 208 selects a service provider 210, 212, or 214 for a given client request and passes the selection to load balancer 204, which in turn passes the client request to the selected service provider 210, 212, or 214. The selected service provider 210, 212, or 214 performs the requested service and then passes the resulting information to client 220 via load balancer 204 or other appropriate means.

In SOA system 200, each of service providers 210, 212, 214 is configured as a separate processor-based device that runs programs to provide a variety of different services available to client 220. Such processor-based devices may be substantially identical or may be different and may run the same or different software. One of the advantage of an SOA system is that services are loosely coupled to an operating system and communicate with each other and with the client by standard protocols, thereby allowing for disparate hardware and software among the service providers 210, 212, 214.

In some examples, the processor-based devices utilized for service providers 210, 212, 214 may differ with respect to CPU speed, available memory, network connection, computing load, and the like; thus, running time for a particular action on a given processor-based device may vary from that of other devices and may vary over time. Accordingly, STTR 206 monitors service action statistics for each of service providers 210, 212, 214 and updates its database therewith. In embodiments which use Enterprise Service Bus (ESB) protocols or Business Process Management (BPM) protocols, the service action statistics are readily available in the messages provided by service providers 210, 212, 214 when returning request results. Therefore, STTR 206 may monitor service providers 210, 212, 214 by reading their messages. In other embodiments, the monitoring may be performed by any appropriate technique, including polling by STTR 206, pushed messages from service providers 210, 212, 214, and/or the like.

As mentioned above, the SOA system 200 may be implemented as a client-server arrangement in which client 220 communicates with server 202. However, the scope of embodiments is not limited to any particular client-server architecture. Another example implements the load balancing capabilities in a cloud computing environment so that load balancer 204, STTR 206, and STDM 208 are physical or virtualized devices in the cloud, and where client 220 is unaware of any particular physical architecture. An example embodiment uses the load balancing capabilities of load balancer 204, STTR 206, and STDM 208 within a cloud computing resource to select among multiple processor-based devices that provide cloud computing services.

Furthermore, while the discussion above refers to service provider machines, the scope of the disclosure is not limited to the service providers 210, 212, 214 being implemented as separate physical devices. In some examples, the service providers 210, 212, 214 may be implemented as virtual machines running on one or more processor-based devices.

STTR 206 employs one or more databases to store its information. As mentioned above, STTR 206 monitors the service action statistics of each of service providers 210, 212, 214 and updates its database with that information to build a record for each machine for each action, to the extent such information is available. STTR 206 also has information that associates each of the services with its constituent actions. In one example, the services within SOA system 200 are defined before the services are offered so that the definitions of the services (including identification of constituent actions) may be pre-programmed into STTR 206. In another example, either the STDM 208 or the STTR 206 may query any of service providers 210, 212, 214 for the identities of constituent actions if they are not pre-programmed. Any appropriate technique to identify constituent actions of a service are within the scope of the present disclosure.

Thus, various embodiments provide machine selection by examining the running times corresponding to finer-grained actions rather than coarser-grained services. In some instances, such functionality may provide relatively reliable estimates of service running times, thereby facilitating more effective machine selection within system 200.

Figure 3:
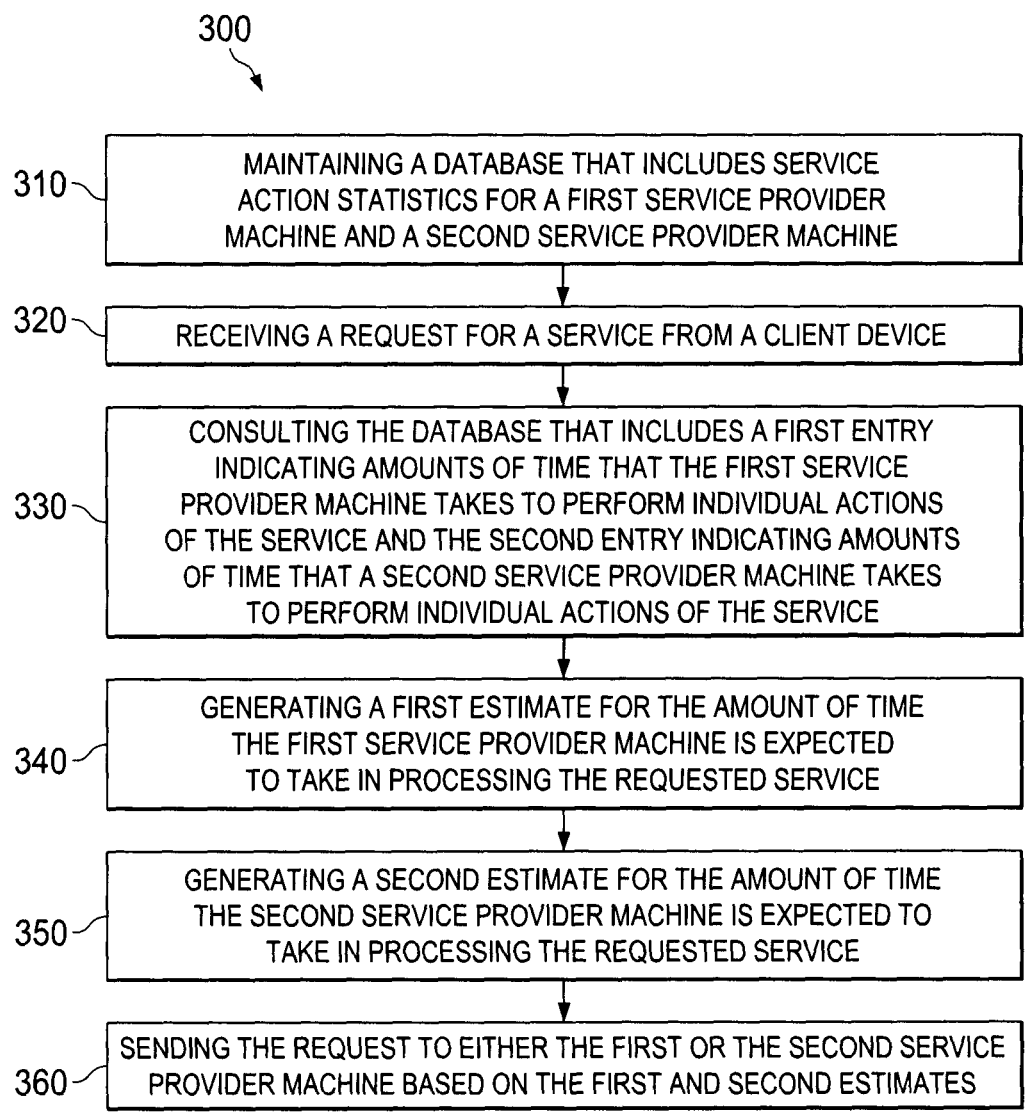
FIG. 3 is an illustration of an example process, adapted according to one embodiment, to select a machine to execute a client request according to the examples above.

FIG. 3 is an illustration of method 300, adapted according to one embodiment, to select a machine to execute a client request according to the examples above. The actions of FIG. 3 may be performed by one or more applications running on one or more processor-based devices to implement the functions of load balancer 204, STTR 206, and STDM 208 (FIG. 2). In some embodiments, the various actions are carried out by one or more computer processors executing computer code to provide the described functionality.

In action 310, the system maintains a database that includes service action statistics for a first service provider machine and a second service provider machine. For instance, an application such as STTR 206 of FIG. 2 may obtain running times for a variety of actions, for each machine, as the running times become available. In some examples, the system may continually or periodically access the running times to update entries in the database. As explained above, the running times may be accessed by reading messages from service providers, by polling service providers, by pushed messages from service providers, and/or the like. Action 310 may also include keeping a database of services and their constituent actions for reference when a client requests a particular service.

In action 320, a load balancer or other application receives a request for a service from a client device. In this example, the service includes a plurality of discrete actions, which individually may or may not be visible to the client but cumulatively constitute the requested service. In some examples, action 320 may include the system consulting a database or the service provider machines to discern which actions are associated with the requested service. For instance, in a system that offers many different services to the client, the set of all possible actions known by the system may include a subset of actions that are actually associated with the requested service—it is this subset of actions that are of interest in this example.

In action 330, the system consults the database that includes a first entry indicating amounts of time that the first service provider machine takes to perform individual actions of the service and a second entry indicating amounts of time that a second service provider machine takes to perform individual actions of the service. In the example of FIG. 2, the database is associated with STTR 206, as explained above at action 310. Action 330 may be performed in some instances by the load balancer 204 or the STDM 208.

In action 330, the system acquires information that should allow the system to estimate the amount of time that the first machine is expected to take to perform the requested service and the amount of time that the second machine is expected to take to perform the service. In the present disclosure, the system has information available for the individual actions, which is relatively fine-grained when compared to the services themselves. Thus, in many instances, the estimates for running times of the services may be suitably precise when the running time data is truly representative of the actual running times.

Figure 4:
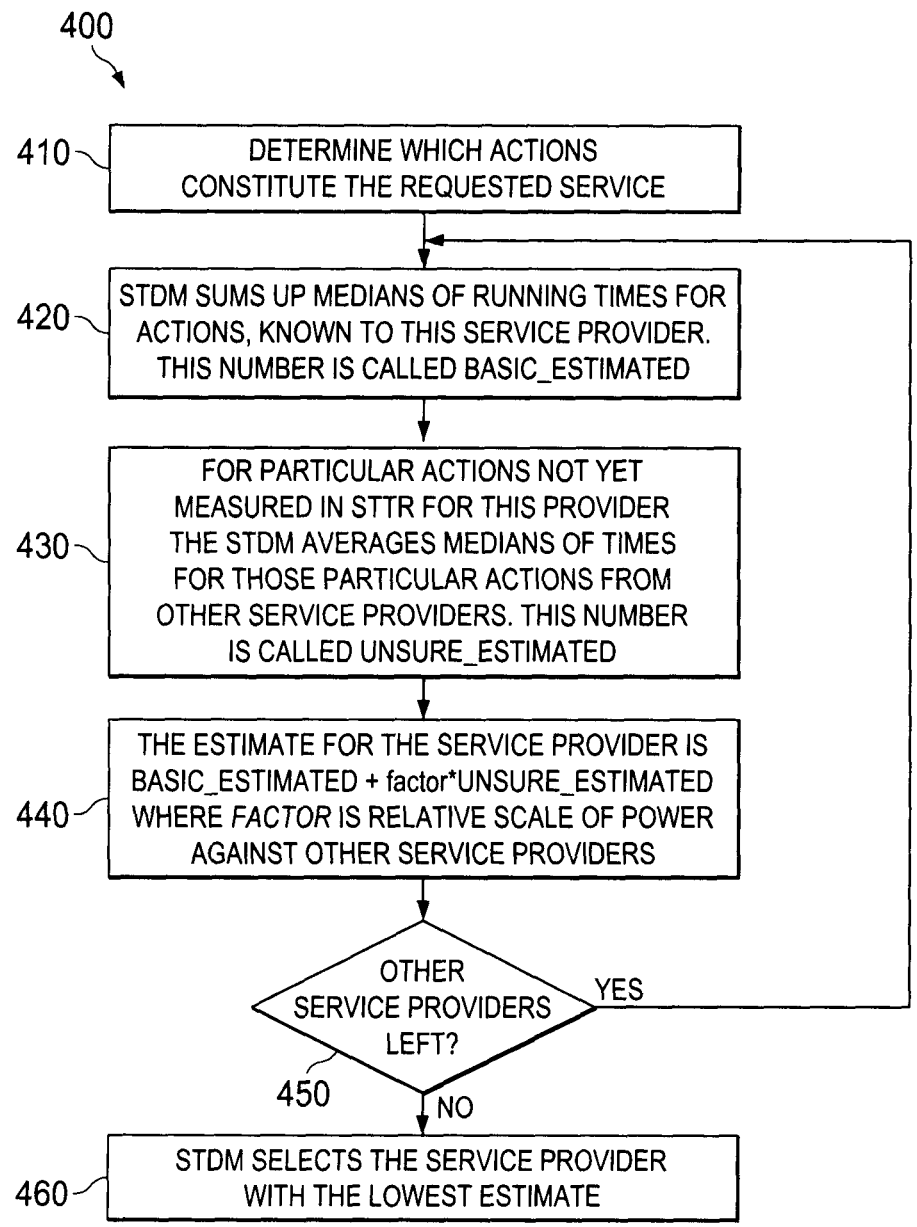
FIG. 4 is an illustration of an example process, adapted according to one embodiment.

In action 340, the system generates a first estimate for the amount of time the first service provider machine is expected to take in processing the requested service. In the example of FIG. 2, the STDM 208 performs action 340. In some examples, action 340 may be as simple as summing the times associated with each of the actions from the first database entry. However, in other instances, the first database entry may lack information for one or more of the constituent actions, in which case FIG. 4 provides a possible solution for estimating an action running time.

In action 350, the system generates a second estimate for the amount of time the second service provider machine is expected to take in processing the requested service. In the example of FIG. 2, the STDM 208 performs action 350. Similar to the discussion above for action 340, action 350 may be as simple as summing the times associated with the actions from the first database entry. However, in other instances, the second database entry may lack information for one or more of the constituent actions, in which case FIG. 4 provides a possible solution for estimating an action running time. Any appropriate technique to generate the first and second estimates is within the scope of embodiments.

Furthermore, rather than simply summing running times for each action for each machine, the system may use more sophisticated mathematical algorithms to generate the first and second estimates at actions 340, 350. For instance, when the database includes multiple entries over time for a given action for a given machine, the system may calculate a mean, median, or other useful number out of the multiple entries over time for that particular action. Thus, in one example, the sum of action times for the first estimate (and the second estimate) may be a sum of medians rather than a sum of simple time entries. Once again, any appropriate technique to generate the first and second estimates from the action running times is within the scope of embodiments.

In action 360, the system sends the client request to either the first or the second service provider machine based on the first and second estimates. In the example of FIG. 2, the load balancer 204 and the STDM 208 perform action 360. For instance, the STDM 208 compares the first and second estimates and then selects the machine that is associated with the lowest estimate. The STDM 208 then sends a communication to the load balancer indicating which machine is selected. In response, the load balancer 204 sends the client request to the selected machine.

The scope of embodiments is not limited to the particular flow shown in FIG. 3. Rather, other embodiments may add, omit, rearrange, or modify one or more actions in accordance with a given design. For instance, some embodiments may repeat process 300 each time a client request is received. Also, in some embodiments, the selection of a machine by the STDM 208 may be one of multiple factors that the load balancer 204 uses to determine which machine should receive the request. For instance, in some embodiments the load balancer itself may be aware of other factors that would affect latency of a machine, such as a large job that is ready to be sent to one of the machines, and such other factors may be taken into account as well when selecting a machine.

Furthermore, while the discussions of FIGS. 2 and 3 refer to three service providers and two service providers, respectively, the scope of the disclosure is not so limited. Rather, a given system may include any appropriate number of different machines from which to choose. Also, various embodiments may include systems that accommodate two or more clients. Moreover, while the examples above refer to SOA systems, the scope of embodiments may include any system that has one or more clients requesting services from two or more remote machines.

FIG. 4 is an illustration of example process 400, adapted according to one embodiment. Similar to the process 300 of FIG. 3, process 400 may be used to select a machine to execute a client request according to the examples above. The actions of FIG. 4 may be performed by one or more applications running on one or more processor-based devices to implement the functions of load balancer 204, STTR 206, and STDM 208 (FIG. 2). In some embodiments, the various actions are carried out by one or more computer processors executing computer code to provide the described functionality.

The actions of FIG. 4 may be used to complement the actions of FIG. 3 in a use scenario in which some service action statistics may be missing from the database. For instance, when the system has not been running long enough to generate reliable data for some actions, or when data for some actions is deemed out-of-date, process 400 may be used to provide reliable estimates of running times in the absence of such information.

In action 410, the system determines which actions constitute the requested service. As explained above, determining the actions that make up a service may include checking a database, asking a service provider, or other appropriate techniques.

As a bit of context for actions 420-440, process 400 addresses a first service provider to generate an estimate and then repeats actions 420-440 for each additional service provider. In action 420, the STDM 208 sums up medians of running times for the actions performed by the service provider. This number is called BASIC_ESTIMATED, and it applies to this service provider only. While action 420 refers to sums of medians of running times, any useful sum based on running times at the STTR 206 may be used by various embodiments, whether employing medians or other numbers.

In action 430, for particular actions not yet measured in the STTR for this service provider the STDM 208 averages medians of times for those particular actions from other service providers. This number is called UNSURE_ESTIMATED, and it applies to this service provider only. In other words, in the absence of information for a particular service provider for a particular action, the STDM 208 may acquire corresponding information about other service providers performing that action. Thus, UNSURE_ESTIMATED acts a best guess estimation for a particular action for a particular machine in response to the lack of such information.

Once again, while action 430 refers to averaging medians of times, the scope of embodiments may include any suitable calculation that uses similar information for other service providers, whether employing averages of medians or not. For instance, other embodiments may simply average raw running times from other service providers rather than generating and averaging medians.

In action 440, the STDM 208 generates an estimate for the running time of the requested service by the particular service provider. In this example, the estimate for the service provider is BASIC_ESTIMATED+factor*UNSURE_ESTIMATED where factor is a relative number that can be a best guess itself about how to weigh the performance of the service provider. For instance, if the service provider is likely to perform the actions in less time than its peers, the factor may be made less than one. Similarly, if the service provider is likely to perform the actions in more time than its peers, the factor may be made more than one. Parameters that affect the weighting factor may include, e.g., relative CPU power, relative available memory at the CPU, relative network connection speed, prior observed performance of the service provider for other actions, and the like. Any appropriate technique to set the factor is within the scope of embodiments.

In action 450, it is discerned whether there are other service providers that have yet to have an estimate calculated. Process 400 repeats actions 420-440 for each service provider that may perform the requested action.

In action 460, the STDM selects the service provider with the lowest estimate. Action 460 is similar to action 360 of FIG. 3, described above.

When implemented via computer-executable instructions, various elements of embodiments of the present disclosure are in essence the software code defining the operations of such various elements. The executable instructions or software code may be obtained from a tangible readable medium (e.g., a hard drive media, optical media, RAM, EPROM, EEPROM, tape media, cartridge media, flash memory, ROM, memory stick, network storage device, and/or the like). In fact, readable media can include any medium that can store information.

Figure 5:
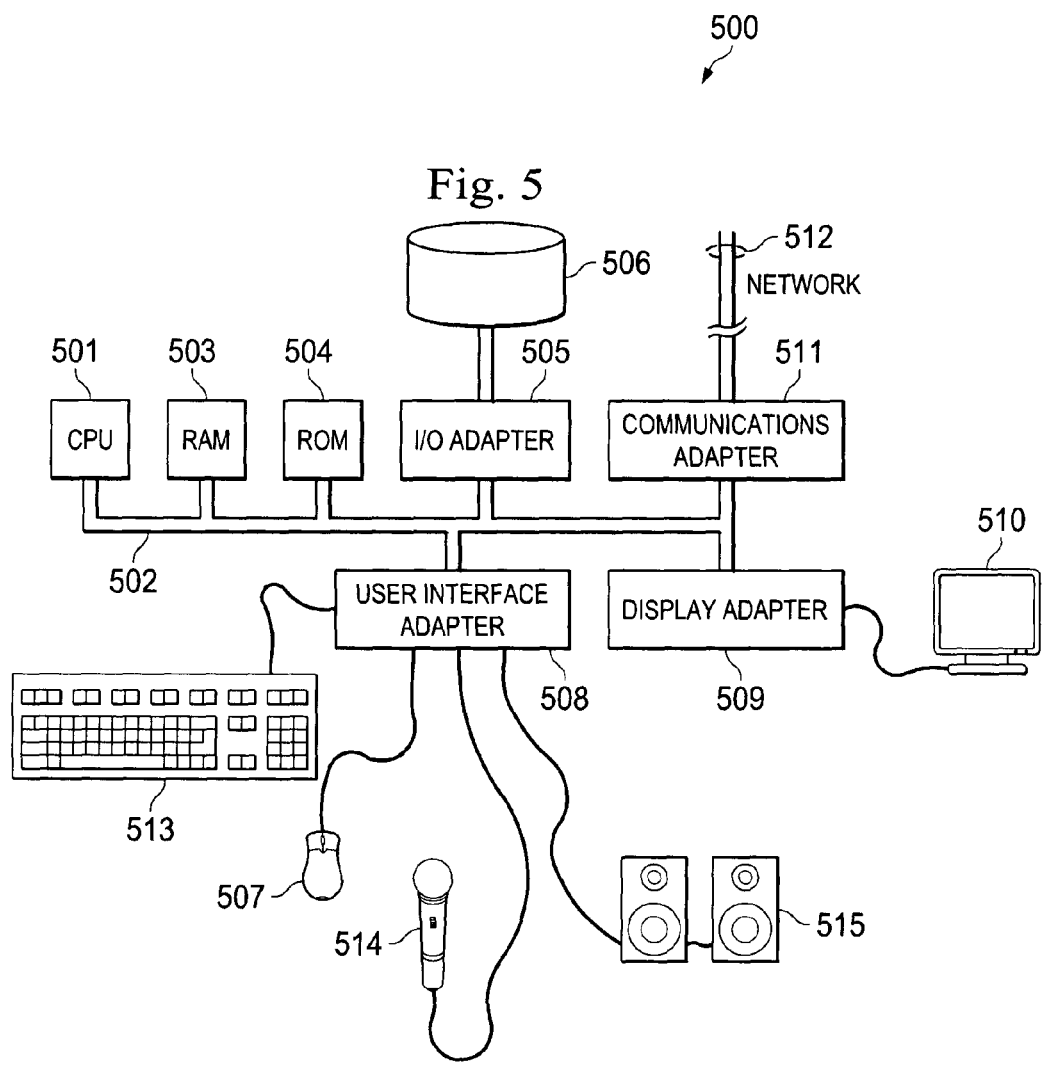
FIG. 5 illustrates an example computer system adapted according to one embodiment of the present disclosure.

FIG. 5 illustrates an example computer system 500 adapted according to one embodiment of the present disclosure. That is, computer system 500 comprises an example system on which embodiments of the present disclosure may be implemented (such as a processor-based device providing service provider functionality, a server computer implementing load balancer, STTR, or STDM functionality, and a computer providing service client functionality, all in FIG. 2).

Central processing unit (CPU) 501 is coupled to system bus 502. CPU 501 may be any general purpose or specialized purpose CPU. However, the present disclosure is not restricted by the architecture of CPU 501 as long as CPU 501 supports the inventive operations as described herein. CPU 501 may execute the various logical instructions according to embodiments of the present disclosure. For example, one or more CPUs, such as CPU 501, may execute machine-level instructions according to the exemplary operational flows described above in conjunction with FIGS. 3 and 4.

Computer system 500 also preferably includes random access memory (RAM) 503, which may be SRAM, DRAM, SDRAM, or the like. Computer system 500 preferably includes read-only memory (ROM) 504 which may be PROM, EPROM, EEPROM, or the like. RAM 503 and ROM 504 hold user and system data and programs.

Computer system 500 also preferably includes input/output (I/O) adapter 505, communications adapter 511, user interface adapter 508, and display adapter 509. I/O adapter 505, user interface adapter 508, and/or communications adapter 511 may, in certain embodiments, enable a user to interact with computer system 500 in order to input information, such as service requests at a client or administrator requests at a service provider.

I/O adapter 505 preferably connects to storage device(s) 506, such as one or more of hard drive, compact disc (CD) drive, solid state drive, etc. to computer system 500. The storage devices may be utilized when system memory RAM 503 is insufficient for the memory requirements associated with storing media data. Communications adapter 511 is preferably adapted to couple computer system 500 to communication link 512 (e.g., the Internet, a LAN, a cellular network, etc.). User interface adapter 508 couples user input devices, such as keyboard 513, pointing device 507, and microphone 514 and/or output devices, such as speaker(s) 515 to computer system 500. Display adapter 509 is driven by CPU 501 to control the display on display device 510 to, for example, display the results of a service request to a human user at a client.

While FIG. 5 shows a general-purpose computer, it should be noted that the exact configuration of a portion of a system according to various embodiments may be slightly different. For example, a given processor-based device in one or more examples may be implemented as any suitable computer, such as a laptop computer, a tablet computer, a server computer, a smartphone, and/or the like.

In accordance with embodiments of the present disclosure, computer system 500 performs specific operations by CPU 501 executing one or more sequences of one or more instructions contained in system memory component 503. Such instructions may be read into system memory component 503 from another computer readable medium, such as ROM 504 or drive 506. In other embodiments, hard-wired circuitry may be used in place of (or in combination with) software instructions to implement the present disclosure.

Logic may be encoded in a computer readable, non-transitory medium. Such a medium may take many forms, including but not limited to, non-volatile media and volatile media. In various implementations, non-volatile media includes optical or magnetic disks, such as disk or solid-state drive component 506, and volatile media includes dynamic memory, such as system memory component 503. CPU 501 reads application code from the readable medium and executes the code to provide the described functionality.

In various embodiments of the present disclosure, execution of instruction sequences to practice the present disclosure may be performed by computer system 500. In various other embodiments of the present disclosure, a plurality of computer systems (not shown) coupled by communication link 512 (e.g., a communications network, such as a LAN, WLAN, PTSN, and/or various other wired or wireless networks, including telecommunications, mobile, and cellular phone networks) may perform instruction sequences to practice the present disclosure in coordination with one another.

It should be appreciated that like reference numerals are used to identify like elements illustrated in one or more of the figures, wherein these labeled figures are for purposes of illustrating embodiments of the present disclosure and not for purposes of limiting the same.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A method comprising:
   receiving a request for a service from a client device, wherein the service is constituted by a plurality of discrete actions;
   consulting a database that includes a first entry indicating amounts of time that a first service provider machine takes to perform individual actions of the plurality of discrete actions and a second entry indicating amounts of time that a second service provider machine takes to perform individual actions of the plurality of discrete actions;
   generating a sum corresponding to the first service provider by summing times associated with the plurality of discrete actions from the first entry;
   acquiring an acquired time from the second entry, the acquired time corresponding to an action of the plurality of discrete actions for which the first entry is lacking information;
   generating a first estimate for an amount of time the first service provider machine is expected to take in processing the requested service, wherein generating the first estimate includes aggregating the sum corresponding to the first service provider with the acquired time from the second entry;
   generating a second estimate for an amount of time the second service provider machine is expected to take in processing the requested service, wherein generating the second estimate includes summing times associated with the plurality of discrete actions from the second entry; and
   sending the request to either the first or the second service provider machine based at least in part on the first and second estimates.

2. The method of claim 1 further comprising:
   building the first entry using performance data provided by the first service provider machine; and
   building the second entry using performance data provided by the second service provider machine.

3. The method of claim 2 in which the performance data provided by the first and second service provider machines is provided by an Enterprise Service Bus (ESB) that serves the client device and the first and second service provider machines.

4. The method of claim 1 performed by one or more load balancing servers in a Service Oriented Architecture (SOA) system.

5. The method of claim 1 in which generating the first estimate further comprises:
   applying a weighting factor to the acquired time from the second entry.

6. The method of claim 5 in which the weighting factor is based on at least one item from the list consisting of:
   processor power associated with the first service provider machine;
   Random Access Memory (RAM) associated with the first service provider machine;
   observed performance of the first service provider machine in performing others of the plurality of actions.

7. The method of claim 1 in which sending the request comprises:
   selecting either the first or the second service provider machine based on a lower one of the first or the second estimates.

8. The method of claim 1 in which each of the first and the second service provider machines are selected from the list including:
- a physical processor-based device; and
- a virtual machine.

9. A system comprising:
- one or more server computers in a Service Oriented Architecture (SOA) system, the one or more server computers providing load-balancing functionality and including:
- a database with a plurality of entries, a first entry being associated with a first service provider machine and including first processing times associated with each action of a plurality of actions, and a second entry being associated with a second service provider machine and including second processing times associated with each action of the plurality of actions; and
- load balancing logic that receives a request for a service from a client device, wherein the service comprises a first subset of the actions of the plurality of actions, the load balancing logic further to:
  - estimate a time to perform the service by the first service provider machine by consulting the first entry for times corresponding to the first subset of actions and consulting the second entry for times corresponding to the first subset of actions for which the first entry is lacking information;
  - estimate a time to perform the service by the second service provider machine by consulting the second entry for times corresponding to the first subset of actions; and
  - send the request to either the first or the second service provider machine based on estimating the times to perform the service.

10. The system of claim 9 in which each of the first and the second service provider machines are selected from the list including:
- a physical processor-based device; and
- a virtual machine.

11. The system of claim 9 comprising a Service Oriented Architecture (SOA) system.

12. The system of claim 11 further comprising an Enterprise Service Bus (ESB) serving the first and the second service provider machines and the one or more servers.

13. A computer program product having a non-transitory computer readable medium tangibly recording computer program logic for processing a client request for a service, the computer program product comprising:
- code to receive the client request for the service, wherein the service is constituted by a set of discrete actions;
- code to compare running times for the service on first machine and on a second machine, wherein the code to compare includes: code to estimate a first running time for the service on the first machine by acquiring first data corresponding to each of the individual actions of the set of discrete actions at the first machine and code to estimate a second running time for the service on the second machine by acquiring second data corresponding to each of the individual actions of the set of discrete actions at the second machine;
- code to send the client request to the first machine or the second machine based at least in part on comparing the running times for the service; and
- the code to estimate the first running time for the service on the first machine further to include code to access a portion of the second data when the first data lacks information for an action of the set of discrete actions.

14. The computer program product of claim 13 in which the code to compare comprises load balancing logic.

15. The computer program product of claim 13 further comprising:
- code to monitor the first machine and the second machine to gather the first data and the second data;
- code to enter the first data into a first entry in a database and to enter the second data in a second entry in the database.

16. The computer program product of claim 15 further comprising:
- code to build the first entry using performance data provided by the first machine; and
- code to build the second entry using performance data provided by the second machine.

17. The computer program product of claim 13 in which the performance data provided by the first and second machines is provided by an Enterprise Service Bus (ESB) that serves a client device and the first and second machines.

18. The computer program product of claim 13 in which the computer program logic is executed by one or more load balancing servers in a Service Oriented Architecture (SOA) system.

19. The computer program product of claim 13 in which code to estimate the first running time further comprises:
- applying a weighting factor to the portion of the second data to characterize a performance of the first machine.

20. The computer program product of claim 19 in which the weighting factor is based on at least one item from the list consisting of:
- processor power associated with the first machine;
- Random Access Memory (RAM) associated with the first machine;
- observed performance of the first machine in performing other actions of the set of actions.

* * * * *